(12) United States Patent
Terada

(10) Patent No.: US 6,285,165 B1
(45) Date of Patent: Sep. 4, 2001

(54) SECONDARY BATTERY PROTECTION CIRCUIT

(75) Inventor: Yukihiro Terada, Isehara (JP)

(73) Assignee: Mitsumi Electric Co., Ltd., Tokyo (JP)

( * ) Notice: Subject to any disclaimer, the term of this patent is extended or adjusted under 35 U.S.C. 154(b) by 0 days.

(21) Appl. No.: 09/385,384

(22) Filed: Aug. 30, 1999

(30) Foreign Application Priority Data

Sep. 9, 1998 (JP) ................................................. 10-255641

(51) Int. Cl.$^7$ ....................................................... H02J 7/00
(52) U.S. Cl. ................................................................ 320/134
(58) Field of Search ..................................... 320/134, 136

(56) References Cited

U.S. PATENT DOCUMENTS

| | | | |
|---|---|---|---|
| 5,705,913 | * | 1/1998 | Takeuchi et al. ..................... 320/134 |
| 5,783,322 | * | 7/1998 | Nagai et al. .......................... 320/134 |
| 5,841,265 | * | 11/1998 | Sudo et al. ............................ 320/134 |
| 5,909,103 | * | 6/1999 | Williams ............................... 320/134 |
| 5,909,104 | * | 6/1999 | Scott .................................... 320/136 |
| 5,986,865 | * | 11/1999 | Umeki et al. ......................... 320/134 |
| 6,104,168 | * | 8/2000 | Aranovich ............................ 320/136 |

OTHER PUBLICATIONS

Allan R. Hambley, Electronics, Prentice–Hall Inc., p. 211.*

* cited by examiner

*Primary Examiner*—Peter S. Wong
*Assistant Examiner*—Pia F Tibbits
(74) *Attorney, Agent, or Firm*—Ladas & Parry

(57) ABSTRACT

A secondary battery protection circuit device for controlling charging of a secondary battery. The device has a first transistor connected in parallel to a power line. The power line connects the secondary battery to be charged to a battery charger, a second transistor connects to the second transistor, the clamping circuit normally clamping at or above ground level. The second and first transistor are turned ON when a residual voltage of the secondary battery is near 0 V and the clamping circuit does not operate. The result is a secondary battery protection circuit comprising a limited number of structural elements and consuming a reduced amount of power, and which is capable of charging a battery such as lithium-ion battery even when the residual voltage of the battery is at or near 0 V.

6 Claims, 4 Drawing Sheets

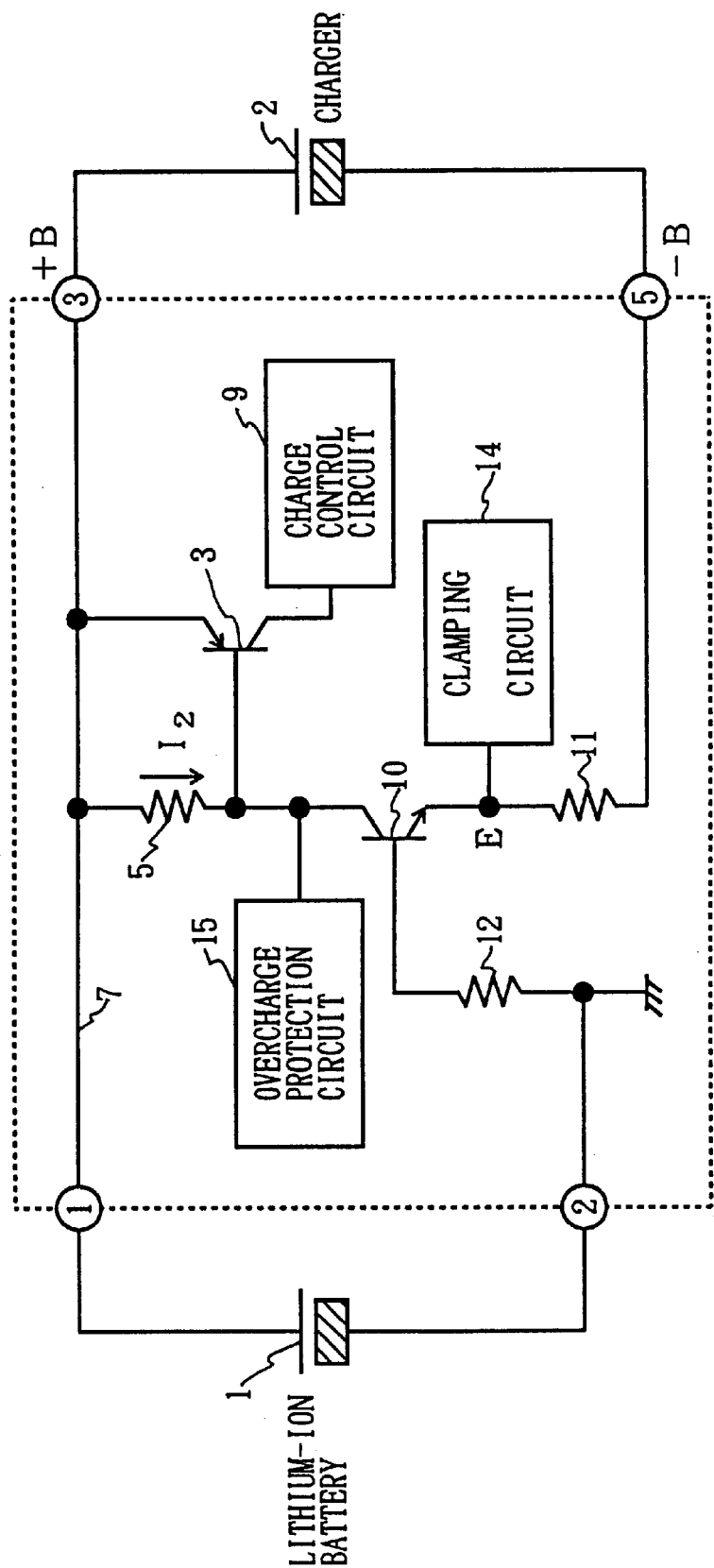

SECONDARY BATTERY PROTECTION CIRCUIT

BACKGROUND OF THE INVENTION

1. Field of the Invention

The present invention relates generally to a secondary battery protection circuit, and more particularly, to a secondary battery protection circuit that permits charging of a secondary battery even when the secondary battery has fully discharged.

2. Description of the Related Art

Compared to the conventional nickel-cadmium storage battery or nickel-hydrogen storage battery, the light, compact lithium-ion battery that is one type of secondary battery delivers approximately three times as much operating voltage. The power, lightness and compactness of the lithium-ion battery has led to its widespread use in video cameras, portable telephones, PHS, lap-top personal computers and a wide array of other portable electronic equipments.

In order to ensure the safety and enhance the performance of these light but powerful batteries, protection circuits have been used.

FIG. 3 shows a circuit for driving a charge control circuit in a conventional lithium battery protection circuit. Between a terminal ① and a terminal ② a lithium-ion battery 1 to be charged is connected. Between a terminal ③ and a terminal ⑤ a battery charger 2 for charging a lithium-ion battery 1 is connected and charges the lithium-ion battery 1. The actual charging of the lithium-ion battery 1 is carried out under the control of the charge control circuit 9.

The circuit that drives the charge control circuit 9 includes a transistor 3, a transistor 4, a resistor 5 and a controller 6. The transistor 3 is provided for charge control drive, and is connected in parallel to a power line 7 that connects the lithium-ion battery 1 and the battery charger 2. The emitter of the transistor 3 is connected to the power line 7, and the base of the transistor 3 is connected to the power line 7 via the resistor 5. The collector of the transistor 4 is connected to a node which connects the base of transistor 3 and the resistor 5. The emitter of transistor 4 is grounded. To the base of transistor 4 the controller 6 is connected, and to the controller 6 the charging terminal ⑤ is connected.

A description will now be given of the charging operation. The negative potential of the battery charger 2 is applied to the base of transistor 4 as a positive potential via the controller 6. As a result, when the transistor 4 is turned ON a current $I_0$ flows. A voltage drop is generated across both ends of the resistor 5 by the current $I_0$ and the base of transistor 3 is forward biased, turning ON the transistor 3. When the transistor 3 is turned ON a positive gate signal is output from the collector of the transistor 3. This gate signal is applied to the charge control circuit 9 to drive the charge control circuit 9 and begin charging the lithium-ion battery 1.

However, the conventional circuit as depicted in FIG. 3 requires the transistor 3 to be turned ON in order to drive the charge control circuit 9. Further, in order to drive this transistor 3 it is necessary to turn ON the transistor 4. Moreover, in order to turn ON the transistor 4 the collector-emitter voltage required to turn ON the transistor 4 must be applied between the collector and the emitter.

In order to achieve the activations described above, the lithium-ion battery 1 must retain the collector-emitter voltage necessary to turn ON the transistor 4. However, if the lithium-ion battery 1 is almost completely discharged then the residual voltage of the battery is not enough to turn ON the transistor 4. In that case the transistor 4 cannot be turned ON and, accordingly, the transistor 3 also cannot be turned ON. As a result, no drive signal can be output from the collector of the transistor 3 to the charge control circuit 9.

It is possible to charge the lithium-ion battery 1 even when the residual voltage of the battery is 0 V if a circuit configuration like that shown in FIG. 4 is used. In that case, connecting a battery charger 2 between a terminal ③ and a terminal ⑤ causes a current $I_1$ to flow, a transistor 3 is turned ON by a voltage drop across the resistor 5, a positive drive signal is obtained from the collector of the transistor 3 and a drive signal can be applied to the charge control circuit 9.

However, the circuit described above consumes power. When the battery charger 2 is connected between the terminals ③ and ⑤, the current $I_1$, flows through resistors 5 and 8 such that a power described by formula (1) is consumed, where $R_5$ is the resistance of resistor 5 and $R_8$ is the resistance of resistor 8.

$$I_1^2(R_5+R_8) \tag{1}$$

It should be noted that the circuit shown in FIG. 4 can still operate even if the resistor 5 is removed, although the same problem of power consumption remains due to the operation of resistor 8.

It is possible to externally connect a logic circuit on the protection circuit so as to obtain a positive drive signal from the collector of the transistor 3 even when the residual voltage of the lithium-ion battery 1 to be charged is 0 V. However, in that case the scale of the circuit increases substantially.

SUMMARY OF THE INVENTION

Accordingly, it is an object of the present invention to provide a secondary battery protection circuit in which the problems described above are solved.

In particular, it is an object of the present invention to provide a secondary battery protection circuit comprising a limited number of structural elements and consuming a reduced amount of power, and which is capable of charging a battery such as a lithium-ion battery even when the residual voltage of the battery is 0 V.

The above-described object of the present invention is achieved by a secondary battery protection circuit for controlling charging of a secondary battery, comprising[: ] a first transistor having either an emitter or a collector thereof coupled in parallel to a power line coupling a secondary battery which is to be charged and a battery charger. Further, a base of the first transistor being coupled to the power line via either a resistor or a leak absorption circuit. A second transistor having either a collector or an emitter thereof coupled to the base of the first transistor. Further, a clamping circuit having a node coupled to either the emitter or the collector of the second transistor, the clamping circuit normally clamping the node at or above ground level. Finally, the second transistor and the first transistor being turned ON when a residual voltage of the secondary battery is near 0 V and the clamping circuit does not operate.

According to the invention described above, it is possible to provide a secondary battery protection circuit comprising a limited number of structural elements and consuming a reduced amount of power, and which is capable of charging a battery such as a lithium-ion battery even when the residual voltage of the battery is 0 V.

Additionally, the above-described object of the present invention is also achieved by the secondary battery protection circuit as described above, further comprising an overcharge protection circuit, the overcharge protection circuit being controlled depending on a potential at a node connecting the base of the first transistor and the resistor or leak absorption circuit.

According to the invention described above, charging of the battery can be halted when overcharged.

Further, the above-described object of the present invention is also achieved by the secondary battery protection circuit as described above, wherein the clamping circuit commences operation when the potential of the secondary battery is at or above a predetermined potential.

According to the invention described above, the amount of power consumed can be drastically reduced.

Additionally, the above-described object of the present invention is also achieved by a secondary battery protection circuit for controlling charging of a secondary battery, comprising[: ] a first transistor coupled parallel to a power line coupling a secondary battery which is to be charged and a battery charger, either the emitter or the collector of the first transistor being coupled to the power line, a base of the first transistor being coupled to the power line via either a first resistor or a leak absorption circuit. Further, a second transistor having either a collector or an emitter thereof coupled to a node connecting the base of the first transistor and the first resistor or leak absorption circuit, a base of the second transistor being grounded via a second resistor. Finally, a clamping circuit having a node coupled to either the emitter or the collector of the second transistor, the clamping circuit normally clamping the node at or above ground level, the node being coupled to the battery charger via a third resistor. The second transistor and the first transistor being turned ON when a residual voltage of the secondary battery is near 0 V and the clamping circuit does not operate. Additionally, the above-described object of the present invention is also achieved by a secondary battery protection circuit adapted to control charging of a battery which is to be charged by a charger, comprising a charging control circuit which controls charging of the battery by the charger. A clamping circuit which clamps a voltage dependent on a battery voltage of the battery when the battery voltage is greater than a predetermined level. The charging control circuit operating based on the battery voltage when the battery voltage is greater than the predetermined level, and operating based on the voltage clamped by the clamping circuit when the battery voltage is less than or equal to the predetermined level.

Additionally, the above-described object of the present invention is also achieved by a battery unit, comprising a battery which is to be charged by a charger. Further, a battery protection circuit, said battery protection circuit comprising a charging control circuit which controls charging of the battery by the charger. A clamping circuit which clamps a voltage dependent on a battery voltage of the battery when the battery voltage is greater than a predetermined level, the charging control circuit operating based on the battery voltage when the battery voltage is greater than the predetermined level, and operating based on the voltage clamped by the clamping circuit when the battery voltage is less than or equal to the predetermined level.

Other objects, feature and advantages of the present invention will become more apparent from the following detailed description when reading in conjunction with the accompanying drawings.

BRIEF DESCRIPTION OF THE DRAWINGS

FIG. 1 is a circuit diagram for explaining an embodiment of the present invention;

DESCRIPTION OF THE PREFERRED EMBODIMENTS

Figure 2A:
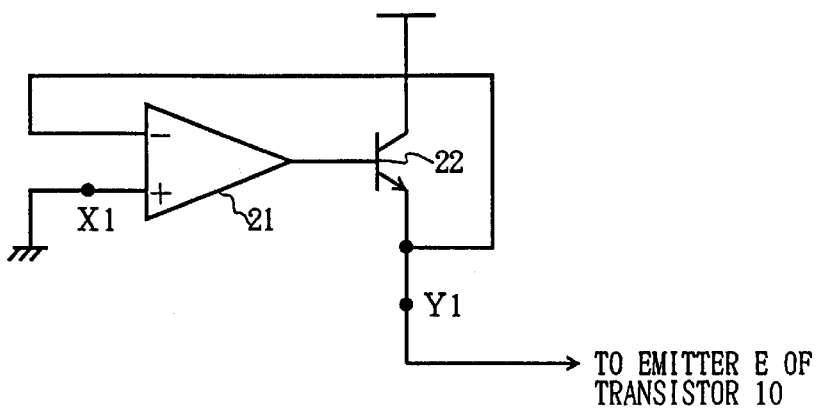
FIGS. 2A, 2B and 2C are circuit diagrams of embodiments of the clamping circuit.

A description will now be given of an embodiment of the present invention with reference to the accompanying drawings. In the following description, a lithium-ion battery is used as the secondary battery. However, the present invention can of course be applied to secondary batteries other than lithium-ion batteries.

FIG. 1 shows a circuit for driving a charge control circuit in the embodiment of the secondary battery protection circuit according to the present invention. A lithium-ion battery 1 is connected between terminals ① and ②, and a charger is connected between terminals ③ and ⑤ to charge the lithium-ion battery 1.

The circuit that drives a charge control circuit 9 includes transistors 3 and 10, resistors 5, 11 and 12, a clamping circuit 14, and an overcharge protection circuit 15. The charge control drive transistor 3 is connected in parallel to a power line 7 that connects the lithium-ion battery 1 and the charger 2. The emitter of the transistor 3 is connected to the power line 7 and the base of the transistor 3 is connected to the power line 7 via the resistor 5 (this resistor may be a leak absorption circuit). The collector of the transistor 10 is connected to a node which connects the base of the transistor 3 and the resistor 5. A node which connects the emitter E of the transistor 10 and the clamping circuit 14 is coupled to the terminal ⑤ via the resistor 11. Additionally, the base of transistor 10 is grounded via the resistor 12, and the collector of transistor 10 is connected to the overcharge protection circuit 15.

The emitter E of transistor 10 is normally held at or above the ground potential by the clamping circuit 14. As a result, the transistor 10 is turned OFF when the clamping circuit 14 operates.

Next, a description will be given of the operation of the circuit shown in FIG. 1 described above when the lithium-ion battery 1 and the battery charger 2 are connected to the battery protection circuit. Separate descriptions will be provided for when the residual voltage of the lithium-ion battery 1 is at or above a certain voltage (for example, a voltage equal to or exceeding that required to turn ON a transistor), and when the residual voltage of the lithium-ion battery 1 is near 0 V.

In the case in which the residual voltage of the lithium-ion battery 1 is at or above a certain voltage, the battery protection circuit is turned ON by the power of the lithium-ion battery 1 itself. As a result, the clamping circuit 14 operates and the transistor 10 is turned OFF. Next, the base of the transistor 3 is forward biased by the power of the lithium-ion battery 1 via the resistor 5, the transistor 3 is turned ON, and a positive drive signal is output from the collector of the transistor 3. As a result, the charge control circuit 9 is driven and charging of the lithium-ion battery 1 is carried out.

In the case in which the residual voltage of the lithium-ion battery 1 is near 0 V, the individual circuits of the battery protection circuit are inactive except for the transistor 10. The voltage of the charger 2 is applied to the transistor 10 via the resistors 5 and 11, that is, a positive voltage is applied to the collector of the transistor 10 and a negative voltage is applied to the emitter, thus turning ON the transistor 10.

As a result, a current $I_2$ flows through the resistor 5. A voltage drop caused by current $I_2$ is generated across both ends of the resistor 5, the base of transistor 3 is forward biased, and the transistor 3 is turned ON. When the transistor 3 is turned ON, a positive drive signal is output from the collector of the transistor 3. As a result, the charge control circuit 9 is driven and charging of the lithium-ion battery 1 commences.

Thereafter, as charging progresses, the clamping circuit 14 operates. As a result, the level at the emitter E of the transistor 10 is raised to the ground level or above the ground level, and the transistor 10 is turned OFF.

Even with the transistor 10 turned OFF, however, the base of the transistor 3 is forward biased by the power of the lithium-ion battery being charged via the overcharge protection circuit 15, so the ON state of the transistor 3 is maintained. As a result, a positive drive signal continues to be output from the collector of the transistor 3 and applied to the charge control circuit 9. The charge control circuit 9 continues to control the charging.

The overcharge protection circuit 15 detects the charging state by sensing a potential difference across both ends of the lithium-ion battery 1, and stops charging if an overcharge is detected.

The transistor 10 is only turned ON when the residual voltage remaining in the lithium-ion battery to 11 be charged is near 0 V and the clamping circuit 14 described above is not operating, so the amount of power consumed is extremely small.

It should be noted that although the power line 7 shown in FIG. 1 is provided on the positive side of the lithium-ion battery 1 and the charger 2, the power line may be provided on the negative side.

In addition, although in the description provided above a PNP type transistor is used for the transistor 3, an NPN type transistor may be used instead. Similarly, although an NPN type transistor is used for the transistor 4 in the description provided above, a PNP transistor may be used instead.

Figure 2B:
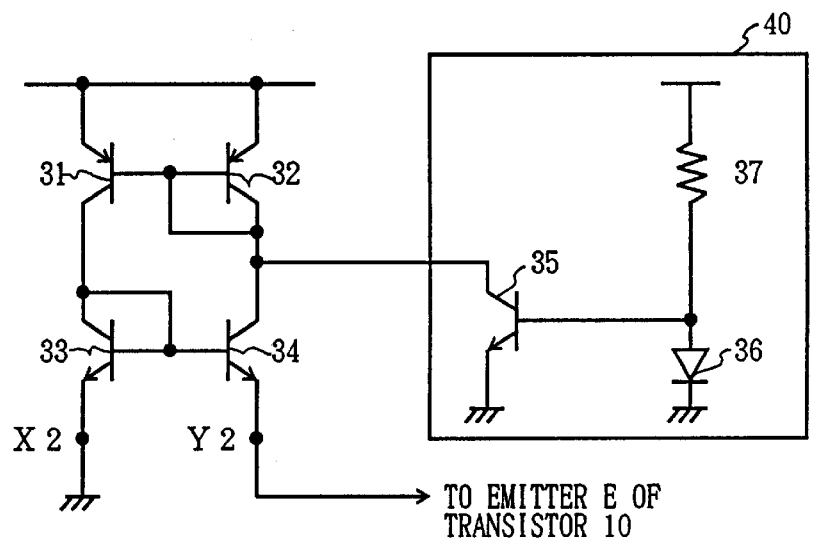
Figure 2C:
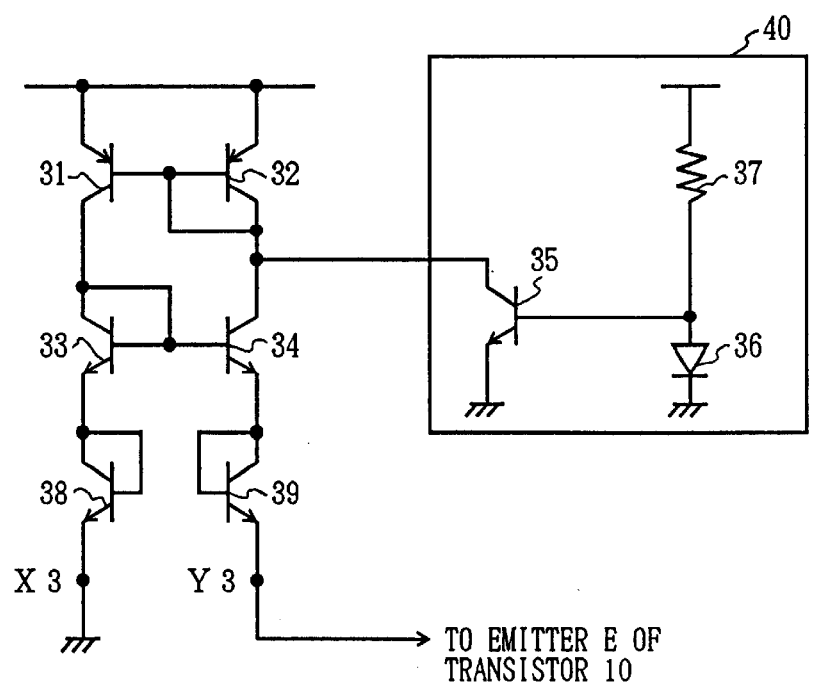
Figure 3:
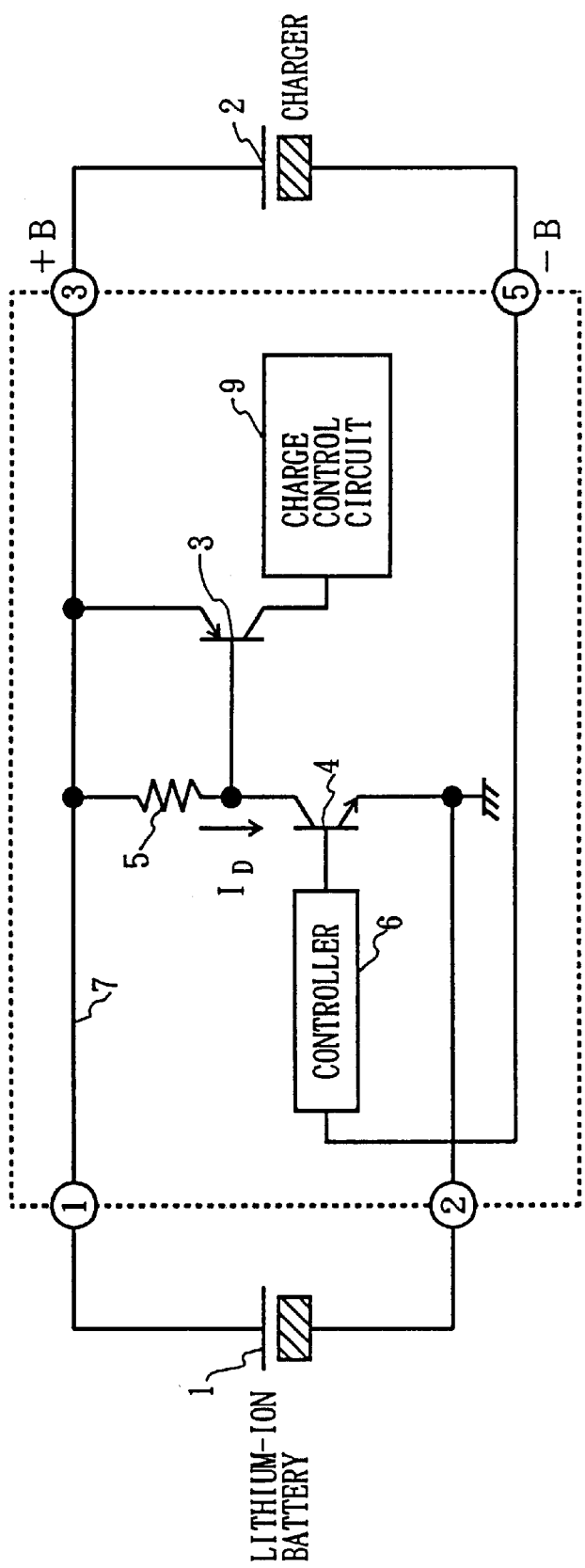
FIG. 3 is a circuit diagram for describing a circuit for driving a charge control circuit in a conventional lithium battery protection circuit.
Figure 4:
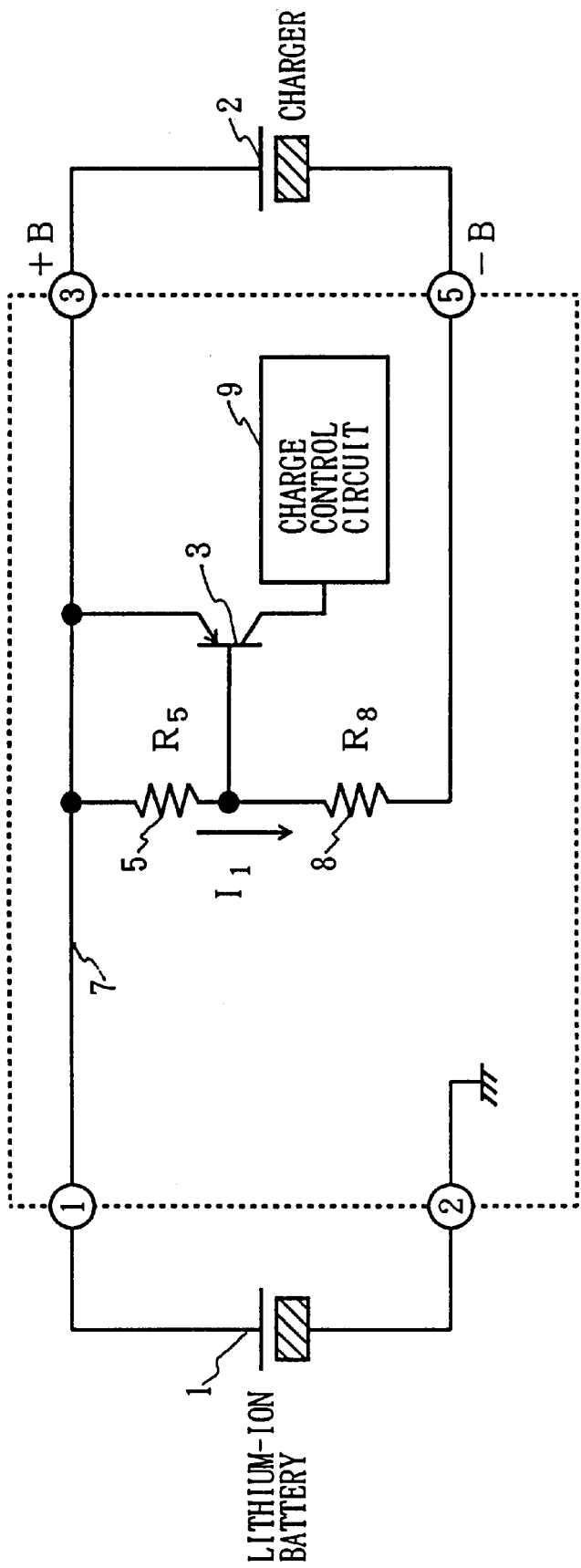
FIG. 4 is a circuit diagram for describing another circuit for driving the charge control circuit in the conventional lithium battery protection circuit.

FIGS. 2A, 2B and 2C show three embodiments of the clamping circuit 14.

In FIG. 2A the clamping circuit 14 comprises an operational amplifier 21 and a transistor 22. A node X1 has the ground potential. When the potential at node Y1 is greater than the potential at the node X1, a negative output from the operational amplifier 21 causes the transistor 22 to turn OFF. As a result, the potential at the node Y1 is directly output as the clamping circuit output.

However, when the potential at the node Y1 is less than the potential at the node X1, the transistor 22 is turned ON by the positive output from the operational amplifier 21. As a result, the potential at the node Y1 becomes the power supply potential applied to the collector of the transistor 22. This power supply potential is output as the clamping circuit output.

As a result, a potential greater than the ground potential is output as the clamping circuit output.

The clamping circuit shown in FIG. 2B comprises two current mirror circuits and an initial bias circuit. Transistors 31 and 32 form a first current mirror circuit, and transistors 33 and 34 form a second current mirror circuit. An initial bias circuit 40 comprises a transistor 35, a diode 36 and a resistor 37, and functions to supply a current to the transistor 32 of the first current mirror circuit when the power is turned ON. The potential across both ends of the diode 36 when the power is turned ON is used as a base-emitter voltage of the transistor 35, causing the transistor 35 to turn ON and supply the current to the transistor 32.

Nodes X2 and Y2 are symmetrical points, so the potential at the node Y2 becomes the potential at the node X2. As a result, the potential at the node Y2 is virtually the same as the ground potential, and this ground potential is output as the clamping circuit output.

FIG. 2C shows a clamping circuit identical to that shown in FIG. 2B, except that transistors 38 and 39 are connected to the emitters of the two corresponding transistors 33 and 34 of the second current mirror circuit. The collector and the base of each of the transistors 38 and 39 are directly connected, and each of the transistors 38 and 39 functions as a diode. The operation of this clamping circuit is identical to that of the clamping circuit shown in FIG. 2B, although as compared to the clamping circuit shown in FIG. 2B the clamping circuit shown in FIG. 2C has a greater withstand voltage.

Nodes X3 and Y3 are symmetrical points, so the potential at the node Y3 becomes the potential at the node X3. As a result, the potential at the node Y3 is virtually the same as the ground potential, and this ground potential is output as the clamping circuit output.

As noted previously, although the embodiments described above refer to a lithium-ion battery, the application of the present invention is not limited to such batteries and may be applied to charge and discharge control for other types of secondary batteries.

The above description is provided in order to enable any person skilled in the art to make and use the invention and sets forth the best mode contemplated by the inventor of carrying out the invention.

For example, the secondary battery protection circuit may be provided within a battery unit or a battery package which includes the battery.

The present invention is not limited to the specifically disclosed embodiments, and variations and modifications may be made without departing from the scope of the present invention.

The present application is based on a Japanese Priority Application No. 10-255641 filed on Sep. 9, 1998, the entire contents of which are hereby incorporated by reference.

What is claimed is:

1. A secondary battery protection circuit for controlling charging of a secondary battery, comprising:
   a first transistor having either an emitter or a collector the first transistor coupled in parallel to a power line which couples a secondary battery which is to be charged and a battery charger, a base of said first transistor being coupled to said power line via either a resistor or a leak absorption circuit;
   a second transistor having either a collector or an emitter thereof coupled to the base of said first transistor; and
   a clamping circuit having a node coupled to either the emitter or the collector of said second transistor, the clamping circuit clamping the node at or above ground level when active,
   said clamping circuit being inactive and said second transistor being turned ON to turn ON said first transistor when a residual voltage of said secondary battery is near 0 V and said clamping circuit being active and turning OFF said second transistor when the residual voltage of said secondary battery is at or above a predetermined potential.

2. The secondary battery protection circuit as claimed in claim 1, further comprising an overcharge protection circuit, said overcharge protection circuit being controlled depending on a potential at a node connecting the base of the first transistor and the resistor or leak absorption circuit.

3. A secondary battery protection circuit for controlling charging of a secondary battery, comprising:

a first transistor coupled in parallel to a power line the first transistor and the power line couple to a secondary battery which is to be charged and a battery charger, either an emitter or a collector of said first transistor being coupled to said power line via either a first resistor or a leak absorption circuit;

a second transistor having either a collector or an emitter thereof coupled to a first node which connects the base of said first transistor and said first resistor or leak absorption circuit, a base of said second transistor being grounded via a second resistor; and a clamping circuit having a second node coupled to either the emitter or the collector of said second transistor, the clamping circuit clamping the second node at or above ground level when active, said second node being coupled to said battery charger via a third resistor, said clamping circuit being inactive and said second transistor being turned ON to turn ON said first transistor when a residual voltage of said secondary battery is near 0 V, and said clamping circuit being active and turning OFF said clamping circuit being active and turning OFF said second transistor when the residual voltage of said secondary battery is at or above a predetermined potential.

4. A secondary battery protection circuit adapted to control charging of a battery which is to be charged by a charger, comprising:

a charging control circuit which controls charging of the battery by the charger; and a clamping circuit which clamps a voltage dependent on a battery voltage of the battery when the battery voltage is greater than a predetermined level, said charging control circuit operating based on the battery voltage when the battery voltage is greater than the predetermined level, and operating based on the voltage clamped by said clamping circuit when the battery voltage is less than or equal to the predetermined level.

5. A battery unit, comprising:

a battery which is to be charged by a charger; and a battery protection circuit, said battery protection circuit comprising:

a charging control circuit which controls charging of the battery by the charger; and a clamping circuit which clamps a voltage dependent on a battery voltage of the battery when the battery voltage is greater than a predetermined level, said charging control circuit operating based on the battery voltage when the battery voltage is greater than the predetermined level, and operating based on the voltage clamped by said clamping circuit when the battery voltage is less than or equal to the predetermined level.

6. A secondary battery protection circuit for controlling charging of a secondary battery, comprising:

a first transistor having either an emitter or a collector thereof coupled in parallel to a power line which couples a secondary battery which is to be charged and a battery charger, a base of said first transistor being coupled to said power line via either a resistor or a leak absorption circuit;

a second transistor having either a collector or an emitter thereof coupled to the base of said first transistor; and a clamping circuit having a node coupled to either the emitter or the collector of said second transistor, the clamping circuit clamping the node to a first predetermined level when active, said clamping circuit being inactive and said second transistor being turned ON to turn ON said first transistor when a residual voltage of said secondary battery is less than a second predetermined level, and said clamping circuit being active and turning OFF said second transistor when the residual voltage of said secondary battery is greater than or equal to the second predetermined level.

* * * * *